(No Model.)
S. PETERS & W. DONALD.
WATER CLOSET.
No. 260,232. Patented June 27, 1882.
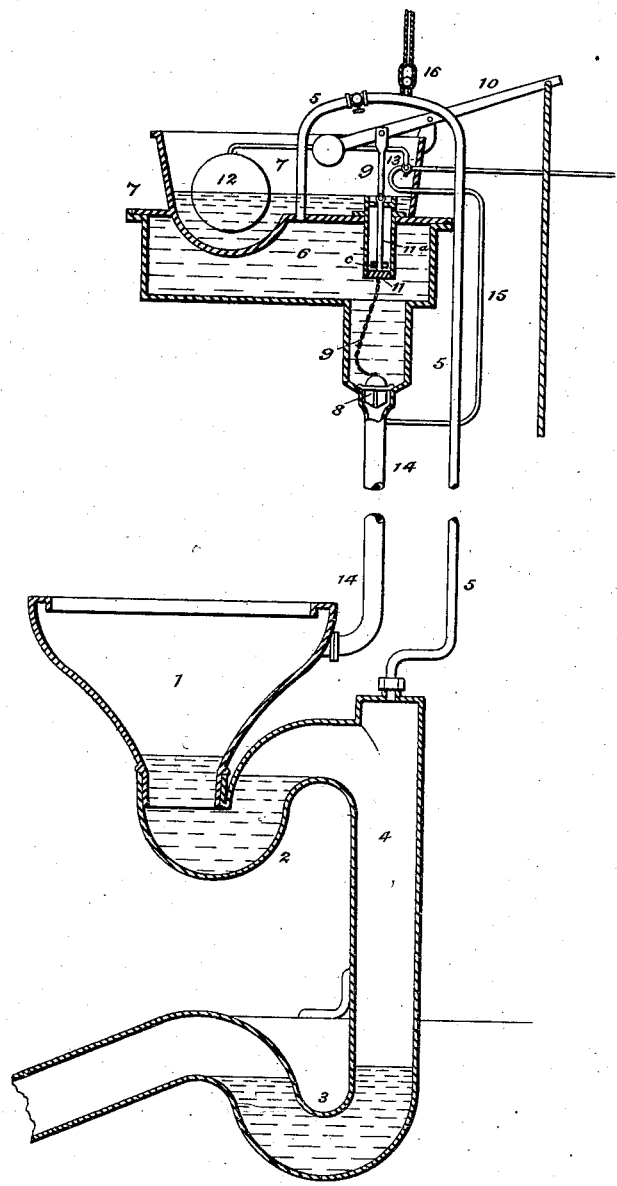
WITNESSES:
E. B. Bolton
Geo Bainton
INVENTORS:
Stewart Peters and William Donald,
By Their Attorneys,
Burke, Fraser & Bennett

UNITED STATES PATENT OFFICE.

STEWART PETERS AND WILLIAM DONALD, OF GLASGOW, SCOTLAND, ASSIGNORS, BY MESNE ASSIGNMENTS, TO HENRY HUBER, OF NEW YORK, N. Y.

WATER-CLOSET.

SPECIFICATION forming part of Letters Patent No. 260,232, dated June 27, 1882.

Application filed November 29, 1881. (No model.) Patented in England April 7, 1874, No. 1,207.

*To all whom it may concern:*

Be it known that we, STEWART PETERS and WILLIAM DONALD, both of Glasgow, Scotland, have invented certain Improvements in Water-Closets, of which the following is a specification.

This invention (which forms the subject of Letters Patent granted to us in Great Britain on the 7th day of April, 1874, No. 1,207) has reference to the traps and water-supply system of water-closets, its objects being to facilitate the emptying and flushing thereof, and to prevent waste of the water supplied thereto.

The accompanying drawing shows one form of our closet in vertical mid-section.

1 is the bowl or basin, 2 and 3 are traps in the discharge-passage leading therefrom, and 4 is an air-space in said passage between the two traps. The trap 2 is located immediately below and leads from the bowl, so as to receive the soil deposited in the latter, and both traps and their connecting-pipe should be made in one piece of earthenware to avoid joints. An air-pipe, 5, leads from the space 4. It is obvious that if sufficient suction be applied to this pipe a portion of the air will be drawn from the space 4, and the trap 2 will be siphoned, nearly all its contents will fall over into the trap 3, and air will be drawn in from the bowl 1, thereby drawing from the room the foul odors resulting from the use of the closet. If then the bowl be flushed with a large volume of water, a strong current will be established through both traps, and they will be thoroughly cleansed. To perform these functions we have devised the form of water-supply apparatus shown, which is arranged above the bowl, and comprises a closed compartment or flushing-chamber, 6, and an open cistern or supply-tank, 7, with the necessary valves. From the top or upper part of the chamber 6 an air-pipe, 5, leads to the air-space 4, and from the bottom of the chamber a flushing-pipe, 14, leads to the bowl 1.

The admission of water to the flushing-pipe is determined by a flushing-valve, 8, and the admission of water from the supply-tank 7 to the chamber 6 is determined by a supply-valve, 11, which in the construction shown rises and falls in a tube, 11ª, so as to move above or below an orifice or port, $c$, in said tube. When the valve 11 is down, as shown, water can flow from the tank 7 down the tube 11ª and through the orifice $c$ into the chamber 6; but when the valve is lifted it closes the tube above the orifice and stops such flow. The valves are operated through the medium of mechanism connected with a pull-handle, with the seat of the closet, or with the door thereof, and when the valve 11 is open or down the valve 8 is always closed or on its seat. The valve 11 always closes before the valve 8 opens, and opens after the valve 8 closes. The valves are shown as being connected to a weighted lever, 10, through a rod, wire, or chain, and this lever is connected by a wire or cord to the closet pull-handle, seat, or door. The tank 7 is supplied by a valve or cock, 13, in the service-pipe, operated by a float, 12, and from this valve we usually lead a pipe, 15, which receives part of the admitted water and conducts it into the flushing-pipe 14.

The drawing shows the normal condition of the parts, the traps 2 and 3 containing water, the air in the space 4 and pipe 5 being slightly compressed, the chamber 6 being full of water, the tank 7 being filled to its normal level, and the valve 8 being closed and the valve 11 open. The parts remain in this condition during the use of the closet and until the movement of the pull-handle, seat, or door tilts the lever 10, which first closes the valve 11 and then opens the valve 8, whereupon the water in the flushing-chamber commences to descend to flush the bowl, and in so doing a suction is created in the upper part of the chamber, air is drawn from the pipe 5 and space 4, and the trap 2 is siphoned, its water carrying with it the soil deposited therein, and the flushing-water from the pipe 14 cleansing the bowl and trap. When the valves are returned to their normal position the chamber 6 refills through the orifice $c$, and in so doing lowers the water-level in the tank 7 and forces back the air into the pipe 5 and space 4, thereby causing a slight compression therein, which will cause the water in the trap 2 to assume a higher level on the side of the bowl 1 than on that of the space 4, as indicated.

The water in the tank 7 is replenished by the opening of the valve 13, and part of the flow through that valve is carried by the pipe 15 into the pipe 5, and thence into the bowl 1, thereby refilling the trap 2. This after-flow will be necessary or desirable, under some circumstances, whenever the flushing-water is insufficient, in connection with the siphoning effect, to leave the trap 2 filled. It is thus seen that the capacity of the chamber 6 is the measure of the water used in flushing the closet, thereby preventing waste of water, while the closet will be thoroughly flushed and kept in cleanly condition.

We usually fit the pipe 5 with a branch vent-pipe, 16, leading to the outer air, and it is necessary to provide this vent-pipe with a check-valve opening upward, thus insuring that no air shall enter to break the vacuum during the siphoning, while permitting the foul air from the space 4 and pipe 5 to lift the valve and escape outside the building when it attains sufficient pressure during the refilling of the chamber 6, or if at any time a pail of slops were thrown into the bowl 1.

It is obvious that with our closet there is no opportunity for sewer-gas to enter the room, for even if the gas were to pass the trap 3 it would have easy escape through the pipes 5 and 16.

We are aware of the constructions of water-closet bowl and traps shown in English Patents No. 252 of 1860 and No. 146 of 1872, neither of which is identical with our invention.

We claim as our invention—

1. A water-closet consisting of a bowl, a fixed trap-bend in the passage leading therefrom, whereby a portion of water is retained in the bowl, a second trap in the discharge-passage leading from the first, whereby an air-space is formed between the two traps, and an orifice communicating with said air-space and adapted for the attachment of an air-pipe, all combined and arranged in substance as described.

2. A water-closet consisting of a bowl, a fixed trap-bend in the soil-passage leading therefrom, whereby a portion of water is retained in the bowl, and a second trap in said soil-passage below the first, whereby an air-space is formed between the two traps, in combination with means for rarefying the air in said space upon the flushing of the closet, substantially as set forth, and for the purposes described.

3. A water-closet consisting of a bowl, a trap leading therefrom, a second trap in the discharge-passage leading from the first, and an air-space between the two traps, in combination with a flushing-valve and means for operating the same to flush the closet, and means for drawing air from the space between the two traps, constructed to be set in operation by the act of opening said flushing-valve, substantially as set forth.

4. A water-closet having a trap leading from its bowl, a second trap in the discharge-passage leading from the first, and an air-space between the two traps, in combination with a flushing-pipe opening into said bowl, a flushing-chamber adapted to supply said pipe, a flushing-valve controlling the admission of water to said pipe, and an air-pipe leading from the air-space between the traps and terminating within the flushing-chamber at the top thereof, substantially as set forth.

5. A water-closet consisting of a bowl, a trap leading therefrom, a second trap in the discharge-passage leading from the first, and an air-space between the two traps, in combination with a pipe leading from said air-space to a flushing-chamber and terminating at the top thereof, the said chamber, an open-air pipe communicating with said pipe and chamber and containing a check-valve opening outwardly therefrom, a flushing-pipe leading from said chamber to the bowl, and a valve controlling the entrance of water to said pipe, substantially as set forth.

6. A water-closet consisting of a bowl, a trap leading therefrom, a second trap in the discharge-passage leading from the first, and an air-space between the two traps, in combination with an air-pipe leading from said space and terminating at the top of a flushing-chamber, the said chamber, a supply-tank, a supply-valve controlling the admission of water from said tank to said chamber, a flushing-valve controlling the escape of water from said chamber and arranged to open after and to close before the supply-valve, and a flushing-pipe leading from said flushing-valve to the bowl, substantially as set forth.

7. A water-closet consisting of a bowl, a trap leading therefrom, a second trap in the discharge-passage leading from the first, and an air-space between the two traps, in combination with an air-pipe leading from said space and terminating in the upper part of a flushing-chamber, the said chamber, a flushing-pipe leading from said chamber to the bowl, a flushing-valve controlling the admission of water to said pipe, a tank to supply said chamber, a float-valve to govern the admission of water from the service-pipe to said tank, and an after-flow pipe leading from said float-valve to the flushing-pipe below the flushing-valve, substantially as set forth.

In witness whereof we have hereunto signed our names in the presence of two subscribing witnesses.

STEWART PETERS.
WILLIAM DONALD.

Witnesses:
PETER FORGIE,
RICHARD WHITE.